US005357448A

United States Patent [19]

Stanford

[11] Patent Number: 5,357,448

[45] Date of Patent: Oct. 18, 1994

[54] METHOD AND APPARATUS FOR CONTROLLING THE PRINTING OF AN IMAGE HAVING A PLURALITY OF PRINTED COLORS

[75] Inventor: Alan R. Stanford, Mukwonago, Wis.

[73] Assignee: Quad/Tech, Inc., Pewaukee, Wis.

[21] Appl. No.: 12,439

[22] Filed: Feb. 2, 1993

[51] Int. Cl.[5] .......... G01J 3/46

[52] U.S. Cl. .......... 364/526; 364/525; 358/534; 356/407; 356/425; 356/379

[58] Field of Search .......... 356/406, 407, 408, 379, 356/380, 425; 364/526, 525, 558; 358/534–536, 456–459

[56] References Cited

U.S. PATENT DOCUMENTS

| | | | |
|---|---|---|---|
| 4,660,159 | 4/1987 | Ott | 364/526 |
| 4,665,496 | 5/1987 | Ott | 364/526 |
| 4,706,206 | 11/1987 | Benoit et al. | 364/551.01 OR |
| 4,717,954 | 1/1988 | Fujita et al. | 358/80 OR |
| 4,947,348 | 8/1990 | Van Arsdell | 364/523 OR |
| 5,068,810 | 11/1991 | Ott | 364/526 OR |
| 5,122,977 | 1/1992 | Pfeiffer | 364/551.01 OR |
| 5,182,721 | 1/1993 | Kipphan et al. | 364/526 OR |
| 5,206,707 | 4/1993 | Ott | 356/406 OR |

*Primary Examiner*—Jack B. Harvey
*Assistant Examiner*—Kamini S. Shah
*Attorney, Agent, or Firm*—Foley & Lardner

[57] ABSTRACT

A method and apparatus for printing a multi-colored image is provided. The image is composed of a plurality of single-color images, each of which is printed by an inking means in a base color ink. The reflectance of the image is measured by a spectrophotometer. Based upon the reflectance of the image and the full-tone reflectance of the base colors in the image, the effective dot density of each of the base colors are determined. The effective dot densities of the base colors of the image are compared to the effective dot densities of the base colors of an exemplary image. Based on the comparison, control signals are sent to the inking means to adjust the amount of ink used to print the single-color images. The effective dot density of the base colors of the image are determined from the reflectance of the image using a prediction process that incorporates a modified form of Neugebauer's model.

25 Claims, 3 Drawing Sheets

METHOD AND APPARATUS FOR CONTROLLING THE PRINTING OF AN IMAGE HAVING A PLURALITY OF PRINTED COLORS

FIELD OF THE INVENTION

The present invention is directed to a method and apparatus for controlling the printing of an image having a plurality of printed colors, and more particularly to a method and apparatus for controlling the amount of each of a plurality of base inks used to print an image based on the effective dot densities of each of the base inks detected in previously printed images.

BACKGROUND OF THE INVENTION

A multi-color printed image is typically produced by combining, through superimposed printing, a plurality of single-color images. Each of the plurality of single-color images is made with a specific base color ink. To create each single-color image, a base color ink is applied in predetermined ink patterns at a predetermined ink film thickness or "ink density". The ink patterns are generally not solid, but are composed of arrays of ink dots which, when viewed at a distance, appear as a solid color. The color produced by such arrays of colored dots are called halftones. The fractional coverage of the dots of a halftone ink pattern is referred to as the dot density of the ink pattern. For example, when ink dots are spaced so that half the area of an ink pattern is covered by ink and half is not, the dot density of the ink pattern is 50%. In addition, the dot density of an ink pattern may also be considered the dot density of the color used to print the ink pattern. For example, if the dot density of a cyan ink pattern is 50%, cyan is said to have a dot density of 50%.

The color quality of a multi-colored printed image is determined by the degree to which the colors of the image match desired colors for the image, or the colors of an exemplary reference image. Thus, the color quality of a multi-color image is largely determined by the printing parameters (ink and dot density) of each of the single-color images of which the multi-colored image is composed. Consequently, an inaccurate ink density setting for any of the base colors, or a change in the actual dot density of a base color, may result in a multi-colored image of inferior color quality.

The dot density of a single-color image is determined by the printing plate used to print that image and, to a lesser extent, by the operating characteristics of the press. The ink density of a base color is determined by the settings of the ink supply for the ink of that color. Ink and dot density may be combined into a single parameter, hereinafter referred to as "effective dot density" or EDD. The EDD of a given single-color image is determined by the actual dot density of the image and the density of the ink used to make the image, and represents the dot density an image with a predetermined ink density would have to possess to produce the color of the given image.

At the start of a printing run, the ink density settings for the various base color inks must be adjusted to achieve the appropriate ink density levels for the single-color images in order to produce multi-color images with the desired colors. Additionally, adjustments to the ink density settings may be required to compensate for deviations in the printing parameters of base colors during a printing run, which deviations may be caused by alignment changes between various rollers in the printing system, or other factors. Adjustments may also be required to compensate for printing parameter deviations that occur from one printing run to another.

In the past, such ink density adjustments have been performed by human operators based merely on conclusions drawn from the visual inspection of printed images. However, such manual control methods tended to be slow, relatively inaccurate, and labor intensive.

Consequently, methods and apparatuses have been developed to automate the control of base ink supplies based on photoelectric measurements of the printed images. Prior art methods and apparatuses for controlling printed colors have included employment of a densitometer in cooperation with color bars printed in a margin outside the area of the printed image. A densitometer is a device for measuring the degree of darkness of an image area ("optical density"). In such prior art systems, one color bar is printed for each of the base colors, and the densitometer measures the ratio of light reflected from bare paper to light reflected from the color bars in order to determine appropriate ink density settings.

One shortcoming of the densitometer apparatus and method is that, with such a system, one must look to the separately printed color bars. If the colors of the color bars are true, then one must presume that the colors in the printed image are, therefore, also correct. However, if the colors in the color bar do not exactly represent the colors of the image, then the ink density settings based on the color bar measurements will be inaccurate.

A further disadvantage of the densitometer method and apparatus is the need to reserve a margin area for the reference base color bars. In a large-volume printing operation, significant savings in paper costs can be realized by eliminating the need for such reservation of margin areas.

One densitometer-based prior art method and apparatus, shown in U.S. Pat. No. 4,660,159 issued on Apr. 21, 1987 to Ott, has been developed which does not require the use of color bars. The Ott method measures and compares the actual reflectance values of a printed image with reference or desired reflectance values to generate control values used for regulating the ink feed of a printing machine. Thus, the Ott method makes ink adjustments based entirely on reflectance value comparisons, and does not determine the EDDs of the base colors of the printed image. Therefore, the Ott method cannot be used to compare the EDDs of the base colors in a multi-color image with desired EDDs.

Further, the Ott method requires off-line measurement of the surface coverage of each printing plate used to make the various single-color images. However, these measurements may not accurately reflect the actual dot density of an image printed with the plate, since dot gain may occur during the ink transfer from the plate to paper. The amount of dot gain that occurs during the transfer depends on the "packing" behind the plate, and is a function of dot area.

Another prior art approach to controlling the printing of colors involves employment of a spectrophotometer. A spectrophotometer is an apparatus which measures reflected light intensity as a function of wavelength. Specifically, spectrophotometer measurements represent the value of reflected light intensity in given spectrum-segments of the light spectrum scanned by the spectrophotometer.

The prior art spectrophotometer method determines the ink density for each base color in an image composed of four base colors, one of which is black. The method measures and records the values for the reflected light intensity for each of two reference bars: a black bar and a single-color bar incorporating the remaining three base colors. The recorded values are then reduced to a three-number index. The three-number index is compared with a stored three-number index indicative of the reflected light intensity that the single (three-color) color bar is supposed to yield when the printed colors are correct. Based on this comparison, the method determines how much of the other base colors are present.

The prior art spectrophotometer method has the disadvantage that one must either measure a three color neutral patch and a black patch, as described above, or know the printing parameters of black or one of the other base colors in the image beforehand. Depending upon the rate which the color of a printed image changes, the operational delay between sampling a printed image, determining the dot density and ink density of one of the colors, and then adjusting the printing apparatus may be unacceptable. Thus, if the "known" ink's printing parameters change during the printing process, the method becomes unreliable.

Similar to the prior art densitometer methods which use a color bar, the prior art spectrophotometer apparatus and method have the disadvantage that they require one to presume that what is observed in a reference color bar (which occupies margin space, thereby wasting paper) correctly indicates what occurs in the printed image.

Based on the foregoing, it is clearly desirable to provide a method and apparatus for on-line determination of the EDD for each base color in a printed image without reliance on a reference color bar. It is further desirable to provide an apparatus and method for the on-line detection of errors in printed colors which makes adjustments to those printed colors without interrupting the printing operation. Finally, it is clearly desirable to provide a device for determining the actual EDD of each of a plurality of base colors in a multi-colored image.

SUMMARY OF THE INVENTION

The present invention provides a device for determining the EDD of each of a plurality of base colors in an image from a plurality of actual reflectance values of the image. The device includes a reflectance prediction circuit disposed to receive a plurality of calibration parameters and a plurality of EDD estimates and generate, in response thereto, a plurality of predicted reflectance values. The device further includes a reflectance comparing circuit coupled to the reflectance prediction circuit. The reflectance comparing circuit is disposed to receive the predicted reflectance values from the reflectance prediction circuit. The reflectance comparing circuit is further disposed to receive the plurality of actual reflectance values, and generate a reflectance error based on the differences between the predicted reflectance values and the actual reflectance values. The device further includes an error comparison circuit coupled to the reflectance comparing circuit and the reflectance prediction circuit. The error comparison circuit is disposed to receive the reflectance error from the reflectance comparing circuit and compare the reflectance error with a maximum acceptable error value and to generate a signal indicative of the results of the comparison. The device further includes an estimation adjustment circuit coupled to the error comparison circuit and the reflectance prediction circuit. The estimation adjustment circuit generates adjusted EDD estimates to the reflectance prediction circuit when the reflectance error is greater than the predetermined maximum error, and the reflectance prediction circuit generates the estimated EDD estimates for use as the actual EDDs of the base colors when the reflectance error is less than the predetermined maximum error.

The present invention further provides a device for determining the EDD of each of a plurality of base colors based on a plurality of actual reflectance values. The device includes means for determining an initial estimate of the density of each of the plurality of base colors, means for predicting the reflectance values that would result from measuring an image composed of the base colors in the estimated EDDs, and means for comparing the actual reflectance values to the predicted reflectance values. The device also includes means for generating a reflectance error term based on the comparison between the actual reflectance values and the predicted reflectance values, and means for adjusting the estimated base color densities to minimize the reflectance error term when the reflectance error term is greater than a predetermined maximum acceptable error.

The present invention further provides a device for controlling the amount of each of a plurality of base inks used to print a multi-colored image. The device includes measuring means for measuring light reflected off the image. The measuring means generates a plurality of actual reflectance values representative of the reflected light. The device further includes an actual dot density circuit coupled to the measuring means and disposed to receive the plurality of actual reflectance values therefrom and generate a plurality of actual EDDs based on the plurality of actual reflectance values. The device also includes a dot density error circuit coupled to the actual dot density circuit. The dot density error circuit is disposed to receive the plurality of actual EDDs from the actual dot density circuit. The dot density error circuit compares the plurality of actual EDDs with a plurality of desired EDDs and generates a EDD error based on the comparison. The device further includes an adjustment calculation circuit which is coupled to the threshold comparison circuit and disposed to receive the EDD error therefrom. The adjustment calculation circuit generates, based on the EDD error, control signals representative of changes in the amount of each of the plurality of base inks to be used in printing an image. Finally, the device includes an ink control circuit coupled to the adjustment calculation circuit. The ink control circuit is disposed to receive the control signals from the adjustment calculation circuit. The ink control circuit is further coupled to a plurality of ink suppliers which control the amount of each of the plurality of base inks used in printing an image. The ink control circuit transmits to each of the ink suppliers a signal to change the amount of ink used in printing an image based on the control signals received from the adjustment calculation circuit.

The present invention further provides a method for determining the EDD for each of a plurality of base colors in a printed image from a plurality of actual reflectance values of the printed image. The method includes the steps of (a) determining an initial estimate of the EDD for each of the plurality of base colors, (b) predicting a plurality of reflectance values corresponding to the plurality of base colors having the estimated EDDs, and (c) comparing the plurality of actual reflectance values to the plurality of predicted reflectance values. The method further includes the steps of (d) generating a reflectance error term based on the comparison between the actual reflectance values and the predicted reflectance values, (e) adjusting the estimates of the EDDs to minimize the reflectance error term when the reflectance error term is greater than a predetermined maximum acceptable error, and (f) repeating steps (b) through (e) until the reflectance error term is less than or equal to the maximum acceptable error.

BRIEF DESCRIPTION OF THE DRAWINGS

The features of the present invention, which are believed to be novel, are set forth with particularity in the appended claims. The invention, together with further objects and advantages thereof, may best be understood by making reference to the following description taken in conjunction with the accompanying drawings, in the several figures of which like reference numerals identify like elements, and wherein:

DETAILED DESCRIPTION OF THE INVENTION

Figure 1:
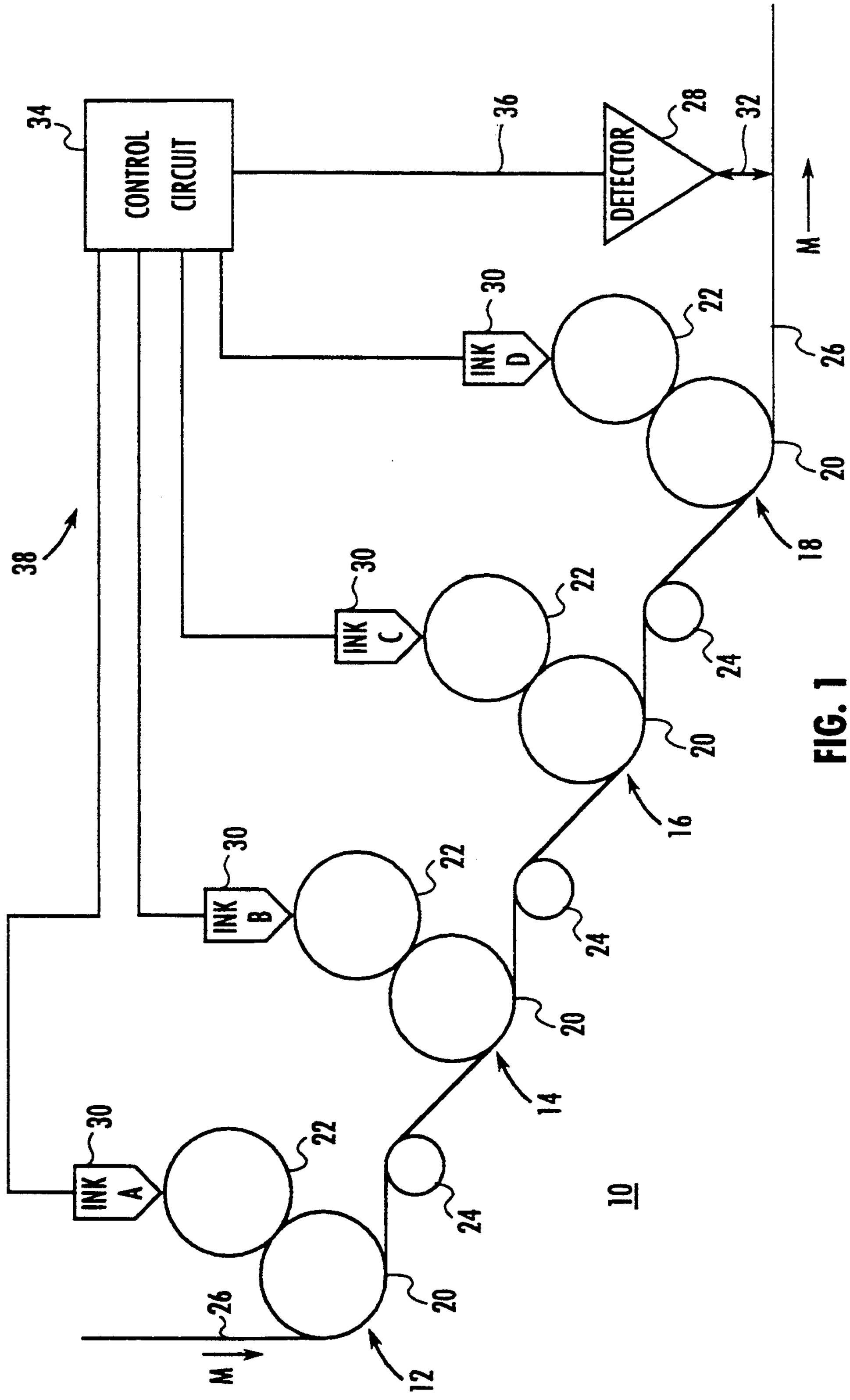
FIG. 1 is a simplified schematic illustration of a printing press employing the apparatus of the present invention.

Referring now to FIG. 1, a printing system 10 for printing a multi-color image upon a web 26 is illustrated. In the presently preferred embodiment, four printing stations 12, 14, 16 and 18 each print one base color image upon web 26. This type of printing is commonly referred to as web offset printing. Each station 12, 14, 16 and 18 includes a blanket cylinder 20 and a printing plate cylinder 22 for printing on one side of web 26. Stations 12, 14, 16 and 18 may also include second blanket and plate cylinders for two-sided printing. An idler roller 24 is situated adjacent each printing station 12, 14, 16 and 18 to aid in leading web 26 through printing system 10. Web 26 travels in a direction indicated by arrows M in FIG. 1. Specifically, web 26 traverses printing system 10 by passing under blanket cylinders 20 successively at each printing station 12, 14, 16 and 18, traversing idler rollers 24, and finally passing a detector 28.

Each printing station 12, 14, 16 and 18 applies a selected base color ink in predetermined ink patterns at a predetermined EDD and a predetermined ink density to web 26 as web 26 traverses printing system 10. In the preferred embodiment, the base color inks are preferably cyan, magenta, yellow and black. Printing system 10 is physically oriented so the each of the single-color images printed on web 26 are in a predetermined position on web 26 relative to the other single-color images. Thus, the finished multi-colored image composed of the various single-color images is produced having a predetermined range of printed colors. The printed colors are determined by the various combinations of the respective base color halftones printed on web 26 as it traverses printing system 10.

In order to effect such printing of images on web 26 in various colors, separate ink supplies 30 are associated with each printing station 12, 14, 16, 18. Thus, printing station 12 receives a first base color ink, ink A, via an ink supply 30, which ink supply 30 cooperates with printing cylinder 22 to transfer ink in a predetermined dot density at a predetermined ink density to blanket cylinder 20. In turn, blanket cylinder 20 transfers the ink to web 26 as web 26 traverses printing station 12. Printing cylinder 22 and blanket cylinder 20 rotate cooperatively to aid traversal of printing station 12 by web 26. Similarly, by cooperation of respective ink supply 30, respective printing cylinder 22, and respective blanket cylinder 20, printing station 14 repetitively applies, at a predetermined dot density and a predetermined ink density, ink B to web 26 in register with the image repetitively printed on web 26 by printing station 12. Predetermined base-color images are similarly imprinted in repetitive registered orientation on web 26 using inks C and D via printing stations 16 and 18, respectively.

Detector 28 is, in its preferred embodiment, a spectrophotometer device which directs incident light to web 26 and detects light reflected from the web 26, as indicated schematically at 32 in FIG. 1. Detector 28 is appropriately aimed to apply incident light to the printed image on web 26. Detector 28 generates a plurality of values representative of the actual reflected light detected from the image printed on web 26 ("actual reflectance values"), and provides the actual reflectance values to a control circuit 34 via a data line 36. Actual reflectance values are values representing the reflected light intensity in given spectrum-segments of the light spectrum of an image.

Control circuit 34 preferably comprises a microprocessor-based circuit which is configured and programmed to receive the actual reflectance values from detector 28 via line 36 and to calculate a plurality of EDDs values ("actual EDD values") from the actual reflectance values. The actual EDD values represent the EDD of each of the base color halftones present in the printed image on web 26. The actual EDD values are calculated by control circuit 34 through the execution of a prediction process which will be described in greater detail below with reference to FIG. 3.

Control circuit 34 compares the plurality of actual EDD values with a corresponding plurality of desired EDD values. The desired EDD values represent the desired EDD for each of the base color halftones employed in printing the image on web 26. The desired EDD values may be, for example, the actual EDD values of an exemplary image. The desired EDD values may be preset within circuitry or programming of control circuit 34, may be stored in the memory of control circuit 34, or may be stored externally of control circuit 34.

Control circuit 34 calculates an EDD error based on the difference between the actual EDD values and the corresponding desired EDD values. Based on the EDD error, control circuit 34 generates appropriate ink control signals to ink supplies 30 to adjust the amount of each of the base inks used to print images on web 26.

Figure 2:
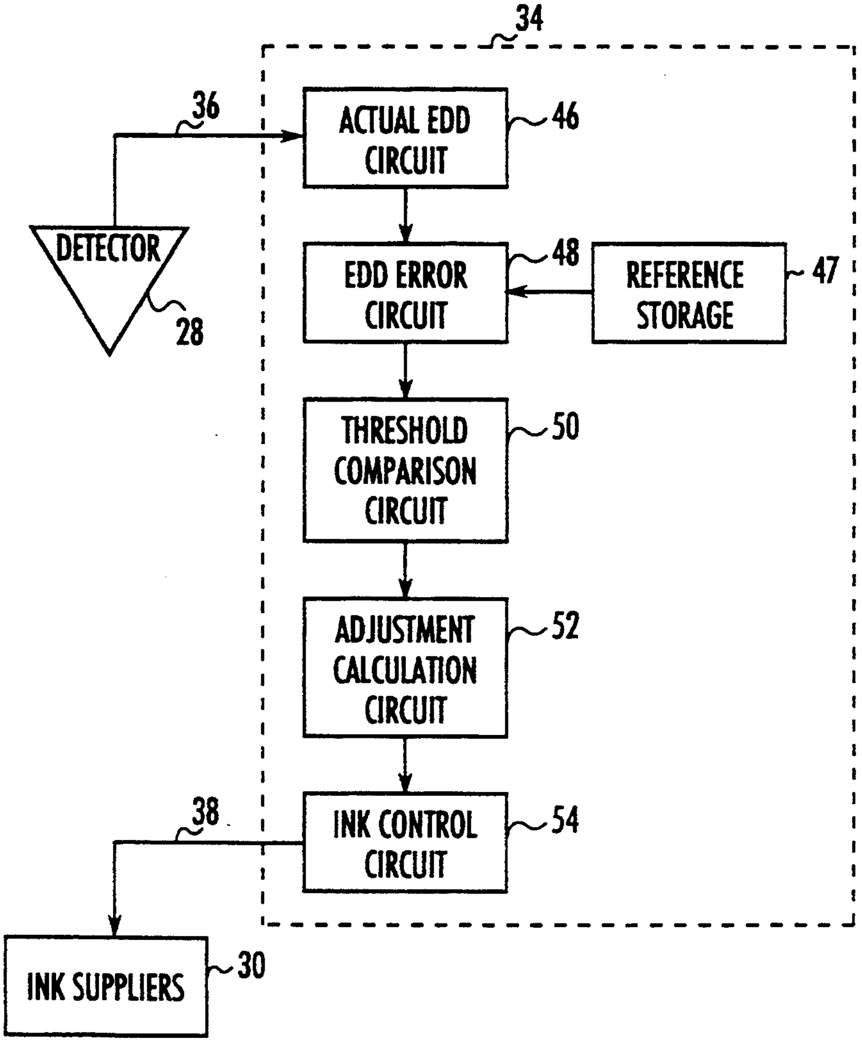
FIG. 2 is a block data flow diagram illustrating one embodiment of the present invention.

FIG. 2 is a data flow diagram illustrating in greater detail one embodiment of control circuit 34. In this embodiment, control circuit 34 includes an actual EDD circuit 46, an EDD error circuit 48, and a threshold comparison circuit 50. Control circuit 34 further includes an adjustment calculation circuit 52 and an ink control circuit 54. According to the preferred embodiment of the invention, circuits 46-54 are implemented on a programmed microprocessor. However, the circuits may alternatively be implemented with analog hardware, or with discrete digital components.

Actual EDD circuit 46 is coupled to detector 28 and is disposed to receive signals indicative of measurements made by detector 28. The values of these measurements are used by control circuit 34 to perform on-line ink control.

Specifically, detector 28 is initially used to measure the spectra of light reflected by each of the base colors at a desired ink density. (i.e., the full tone reflectance values of the base colors) These measurements ("calibration parameters") are transmitted to actual EDD circuit 46 and are used to calibrate control circuit 34. The use of the calibration parameters in actual EDD circuit 46 will be explained in greater detail below with reference to FIG. 3. The measurement of the calibration parameters by detector 28 preferably occurs off-line (e.g., before the printing press begins operating).

The remaining values used by control circuit 34 for ink control are preferably measured on-line by detector 28 (i.e., while the printing press is operating). Specifically, the reflectance values of an exemplary reference image may be measured on-line by detector 28 and transmitted to actual EDD circuit 46. Actual EDD circuit 46 determines the EDDs of the base colors in the exemplary image based on the exemplary image's reflectance values and the calibration parameters. The EDDs thus determined are considered the desired EDD values, and are transmitted to EDD error circuit 48.

Alternatively, desired EDD values may be determined through other methods. For example, they may be determined by photoelectricly measuring printing plates or photographic masters, or may be determined based upon electronic pre-press information. These predetermined desired EDD values may be stored in a reference storage 47, which is accessible by EDD error circuit 48.

Once the calibration parameters and desired EDD values have been determined, detector 28 measures the actual reflectance values of a printed image. The actual reflectance values of the image are then transmitted to actual EDD circuit 46.

Based on the calibration parameters and the actual reflectance values of the printed image, actual EDD circuit 46 determines the actual EDDs for the printed image. Specifically, actual EDD circuit 46 determines the EDDs for each of the base color halftones in the printed image based on the plurality of actual reflectance values and the calibration parameters.

After the actual EDD values of the printed image have been determined by actual EDD circuit 46, the actual EDD values are transmitted to EDD error circuit 48. EDD error circuit 48 compares the actual EDD values of the printed image with the desired EDD values to determine a EDD error.

The EDD error is transmitted to threshold comparison circuit 50, which compares the EDD error with a predetermined maximum acceptable error to determine whether the EDD error is acceptable. The predetermined maximum acceptable error may be a fixed constant, or may be entered by a user. Threshold comparison circuit 50 then transmits to adjustment calculation circuit 52 a signal indicative of the results of this comparison.

If the EDD error is acceptable (i.e., less than the maximum acceptable error), then control circuit 34 makes no changes to the settings of ink supplies 30. However, if the EDD error is not acceptable, then adjustment calculation circuit 52 determines ink adjustment values indicative of changes (both magnitude and direction) in ink supply settings to reduce the EDD error for the next printed image.

The ink adjustment values are then transmitted to ink control circuit 54. Ink control circuit transmits ink control signals responsive to the ink adjustment values to ink supplies 30. In response, ink supplies 30 alter the amount of each of the base inks used to print images.

In an alternate embodiment, adjustment calculation circuit 52 could match the EDD error to the nearest of values for EDD error stored in a table look-up or similar storage arrangement. Such an alternate approach would give effective "digital" accuracy (i.e., accuracy determined by the increments between values for EDD error stored in the table look-up). In such an embodiment, the appropriate adjustments for a given EDD error entry in a table look-up would be co-stored with that entry, thereby eliminating a need for calculation of such adjustments.

Figure 3:
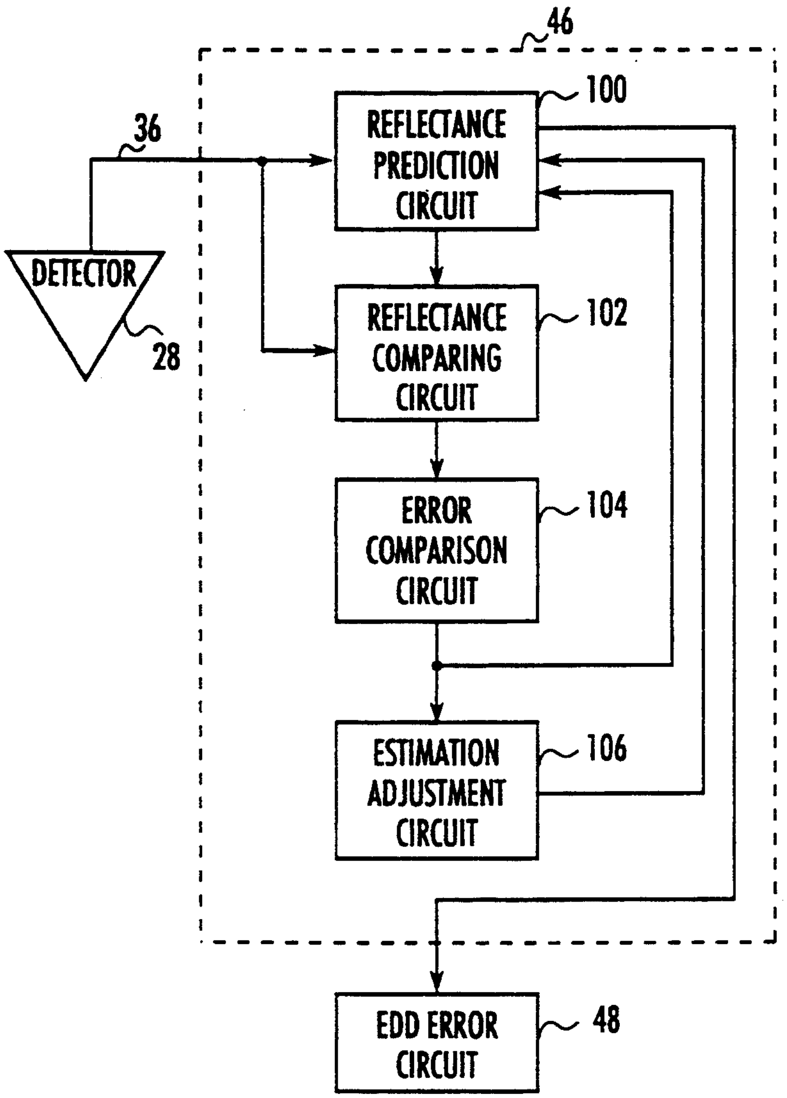
FIG. 3 is a block data flow diagram illustrating the EDD determining circuit of FIG. 2 according to the present invention.

Referring to FIG. 3, actual EDD circuit 46 shall now be described in greater detail. Actual EDD circuit 46 generally includes a reflectance prediction circuit 100, a reflectance comparing circuit 102, an error comparison circuit 104, and an estimation adjustment circuit 106.

Reflectance prediction circuit 100 is disposed to receive the calibration parameters from detector 28, and values indicative of EDDs ("estimated EDDs"), and to generate predicted reflectance values based on the calibration parameters and the estimated EDDs. The estimated EDDs initially used by reflectance prediction circuit 100 may be stored constants, or may be entered by a user. In the preferred embodiment of the present invention, it is initially estimated that an image possesses the base colors inks in the desired EDDs. However, one could alternately initially estimate that all base inks have 100% EDDs or that there is no ink at all on the paper; any other initial values would also suffice.

The predicted reflectance values generated by reflectance prediction circuit 100 for the estimated EDDs represent those reflectance values that would result from measuring, with detector 28, the reflectance of an image which possesses base colors in the estimated EDDs in a predetermined ink density.

Any suitable method of predicting reflectance values for a given set of EDDs may be implemented by reflectance prediction circuit 100, such as Neugebauer's model for the reflectance of half-tone prints, or some progeny of Neugebauer's model.

The preferred process of predicting the reflectance values of a given set of base colors at specified EDDs is based upon a model of the relationship between the dot densities and the reflection spectra of half-tone patterns developed by J. A. Stephen Viggiano at the Rochester Institute of Technology Research Corporation. It extends the Yule-Nielsen modified spectral Neugebauer model.

Hans Neugebauer published, in 1937, a model for the reflectance of half-tone prints. He said that the reflectance of a print is a weighted sum of the reflectances of the inks in the print. The weight for each ink is the relative portion of the paper it covers. Each ink combination is called a Neugebauer primary.

The following are the Neugebauer primaries for four color process printing using black, cyan, magenta, and yellow inks:

| PRIMARY | COMBINATION OF INKS | | | |
|---|---|---|---|---|
| white | | | | |
| cyan | cyan | | | |
| magenta | | magenta | | |
| blue | cyan | magenta | | |
| yellow | | | yellow | |
| green | cyan | | yellow | |
| red | | magenta | yellow | |
| 3-color black | cyan | magenta | yellow | |
| black | | | | black |
| dark cyan | cyan | | | black |
| dark magenta | | magenta | | black |
| dark blue | cyan | magenta | | black |
| dark yellow | | | yellow | black |
| dark green | cyan | | yellow | black |
| dark red | | magenta | yellow | black |
| 4-color black | cyan | magenta | yellow | black |

Neugebauer used Demichel's model for the relative area of each primary. With dots arranged randomly, the area covered by a combination of inks equals the products of the areas covered by the individual inks.

Consider a half-tone printed with the following dot densities:

c=dot density of cyan
m=dot density of magenta
y=dot density of yellow
k=dot density of black Then the area not covered by each ink will be:

1-c=dot density free of cyan
1-m=dot density free of magenta
1-y=dot density free of yellow
1-k=dot density free of black The areas of the half-tone covered by each of the Neugebauer primaries will be:

| | | | | | | | |
|---|---|---|---|---|---|---|---|
| white | (1-c) | * | (1-m) | * | (1-y) | * | (1-k) |
| cyan | c | * | (1-m) | * | (1-y) | * | (1-k) |
| magenta | (1-c) | * | m | * | (1-y) | * | (1-k) |
| blue | c | * | m | * | (1-y) | * | (1-k) |
| yellow | (1-c) | * | (1-m) | * | y | * | (1-k) |
| green | c | * | (1-m) | * | y | * | (1-k) |
| red | (1-c) | * | m | * | y | * | (1-k) |
| 3-color black | c | * | m | * | y | * | (1-k) |
| black | (1-c) | * | (1-m) | * | (1-y) | * | k |
| dark cyan | c | * | (1-m) | * | (1-y) | * | k |
| dark magenta | (1-c) | * | m | * | (1-y) | * | k |
| dark blue | c | * | m | * | (1-y) | * | k |
| dark yellow | (1-c) | * | (1-m) | * | y | * | k |
| dark green | c | * | (1-m) | * | y | * | k |
| dark red | (1-c) | * | m | * | y | * | k |
| 4-color black | c | * | m | * | y | * | k |

The prediction for reflectance at any wavelength is determined by the four predicted dot densities (c, m, y, k) and the measured full tone reflectiveness of the Neugebauer primaries. For example, suppose:

c=0, m=0, y=0.5, and k=0.5, then the areas for each of the Neugebauer primaries are:

| | | |
|---|---|---|
| white | = | 0.5 * 0.5 = 0.25 |
| cyan | = | 0 |
| magenta | = | 0 |
| blue | = | 0 |
| yellow | = | 0.5 * 0.5 = 0.25 |
| green | = | 0 |
| red | = | 0 |
| 3-color black | = | 0 |
| black | = | 0.5 * 0.5 = 0.25 |
| dark cyan | = | 0 |
| dark magenta | = | 0 |
| dark blue | = | 0 |
| dark yellow | = | 0.5 * 0.5 = 0.25 |
| dark green | = | 0 |
| dark red | = | 0 |
| 4-color black | = | 0 |

In this example, the prediction for the reflectance at any wavelength will then be:

0.25 * (white full tone reflectance at that wavelength) +
0.25 * (yellow full tone reflectance at that wavelength) +
0.25 * (black full tone reflectance at that wavelength) +
0.25 * (dark yellow full tone reflectance at that wavelength)

Unfortunately, the Neugebauer model is inaccurate. In 1951, Yule and Nielsen modified Neugebauer's model to account for the penetration of light into the paper under the Neugebauer primaries. They introduced their Yule-Nielsen parameter, n.

Yule and Nielsen modeled only a single color halftone tint, not combinations of inks like the Neugebauer primaries. To predict the halftone reflectance, they first raised the full tone reflectance of the ink and of the paper to the 1/n power, then weighted these modified reflectances by the dot densities or paper area respectively, summed the weighted reflectances, and then raised the sum to the n power.

In 1951 Yule and Colt applied the correction for the penetration of light to the Neugebauer model, producing the Yule-Nielsen modified Neugebauer model.

Viggiano's modification to this model was the caveat that you must apply the model only to narrow wavelength bands. After predicting the reflected spectrum of a half-tone tint, sum the reflectances at all wavelengths to obtain an accurate estimate of the broad band reflectance.

In the example above, the modified prediction for the reflectance at any wavelength will be:

$$\{0.25 * [(\text{white full tone reflectance at that wavelength})^{1/n}]$$
$$0.25 * [(\text{yellow full tone reflectance at that wavelength})^{1/n}] +$$
$$0.25 * [(\text{black full tone reflectance at that wavelength})^{1/n}] +$$
$$0.25 * [(\text{dark yellow full tone reflectance at that wavelength})^{1/n}]\}^{n}$$

In an alternative embodiment, the Yule-Nielsen version of Neugebauer's model may be further modified to provide a variable exponent. Specifically, the Yule-Nielsen parameter, n, may be replaced by a function that varies with wavelength, f(λ).

Once the predicted reflectance values of the estimated EDDs have been determined by reflectance prediction circuit 100, they are transmitted to reflectance comparing circuit 102. In reflectance comparing circuit 102 the predicted reflectance values are compared with the actual reflectance values detected from the printed image. Based upon this comparison, reflectance comparing circuit 102 generates a reflectance error term ("RE"), which is transmitted to error comparison circuit 104.

In the preferred embodiment, RE is determined by reflectance comparing circuit 102 by summing the squared differences between the predicted reflectance values ("PRVs") and the actual reflectance values ("ARVs"). In a simplified example, with reflectance values measured at only two wavelengths ($\lambda_1$, $\lambda_2$), RE would be:

$$RE=[PRV(\lambda_1)-ARV(\lambda_1)]^2+[PRV(\lambda_2)-ARV(\lambda_2)]^2$$

Once RE is determined, it is transmitted to error comparison circuit 104 which compares the RE to a predetermined maximum acceptable error. Error comparison circuit 104 transmits the results of the comparison to reflectance prediction circuit 100 and to estimation adjustment circuit 106. If RE is less than the maximum acceptable error, then reflectance prediction circuit transmits the current EDD estimates to EDD error circuit 48. The EDD estimates are then used as the printed image's actual EDD values.

If, on the other hand, RE is greater than the maximum acceptable error, estimation adjustment circuit 106 adjusts the estimated EDDs to minimize RE. In its preferred embodiment, estimation adjustment circuit 106 implements a converging or search process, such as Marquardt's method, to determine EDD adjustments that will minimize RE.

The Marquardt method is a gradient-expansion process which combines gradient search techniques with a method of linearizing a fitting function. The Marquardt method is described in DATA REDUCTION AND ERROR ANALYSIS FOR THE PHYSICAL SCIENCES by Phillip R. Bevington at pages 235–245.

In an alternative embodiment, estimation adjustment circuit 106 may first perform a linear matrix transformation to determine EDD approximations. The resulting approximations may be accurate enough to proceed directly to the linearized fitting function phase of the Marquardt method, or may be used as a starting point for the gradient search phase of the Marquardt method to minimize the iterations required to perform the gradient search phase.

When estimation adjustment circuit 106 has determined the appropriate adjustments to the estimated EDDs, the adjustments are transmitted back to reflectance prediction circuit 100, where the reflectance values corresponding to the new estimated EDDs are predicted. The control loop thus implemented by circuits 100, 102, 104, and 106 is repeated until error comparison circuit 104 determines that RE is less than the predetermined maximum reflectance error.

It is to be understood that, while the detailed drawings and specific example given describe a preferred embodiment of the invention, they are for the purpose of illustration only, and that the apparatus of the invention is not limited to the precise details and conditions disclosed. For example, the present invention may also be implemented to control the ink feeds of a gravure printing system. Gravure printing does not use a blanket cylinder, but transfers ink directly from plate to paper.

Further, rather than implement a search process to adjust EDD estimates, a look up table may be employed. However, since such a table would necessarily be massive, one might alternatively generate only those sections of the table corresponding to EDDs relatively near the desired EDDs. Thus, color deviations of lesser magnitudes may be corrected by reference to look up tables, while color deviations of greater magnitudes would require the execution of a search process.

These and various other changes may be made without departing from the spirit and scope of the invention which is defined by the following claims.

What is claimed is:

1. A device for determining the effective dot density of each of a plurality of base colors in an image from a plurality of actual reflectance values of the image, comprising:

an initial value source configured to produce a plurality of initial calibration parameters;

an adjustment circuit configured to produce a plurality of operating calibration parameters;

a dot density circuit configured to produce a plurality of effective dot density estimates;

a reflectance prediction circuit coupled to the initial value source, the adjustment circuit and the dot density circuit to receive a plurality of initial and operating calibration parameters and a plurality of effective dot density estimates and generate, in response thereto, a plurality of predicted reflectance values;

a reflectance comparing circuit coupled to the reflectance prediction circuit and being disposed to receive the predicted reflectance values therefrom, the reflectance comparing circuit being further disposed to receive the plurality of actual reflectance values, and generate a reflectance error based on the differences between the predicted reflectance values and the actual reflectance values;

an error comparison circuit coupled to the reflectance comparing circuit and the reflectance prediction circuit, the error comparison circuit being disposed to receive the reflectance error from the reflectance comparing circuit, the error comparison circuit comparing the reflectance error with a maximum acceptable error value and generating a signal indicative of the results of the comparison;

the estimation adjustment circuit being coupled to the error comparison circuit and the reflectance prediction circuit;

wherein the estimation adjustment circuit generates a plurality of adjusted effective dot density estimates to the reflectance prediction circuit when the reflectance error is greater than the predetermined maximum error, and wherein the reflectance prediction circuit generates the estimated effective dot density estimates for use as the actual effective dot densities of the base colors when the reflectance error is less than the predetermined maximum error.

2. The device of claim 1 further comprising means for applying initial effective dot density estimates to the reflectance prediction circuit, wherein the initial effective dot density estimates comprise an initial effective dot density estimate for each of the plurality of base colors.

3. The device of claim 2 wherein the initial effective dot density estimate for each of the plurality of base colors is the desired effective dot density for that base color.

4. The device of claim 2 wherein the initial effective dot density estimate for each of the plurality of base colors is zero percent.

5. The device of claim 2 wherein the initial effective dot density estimate for each of the plurality of base colors is one-hundred percent.

6. The device of claim 1 wherein the plurality of effective dot density estimates comprise an estimate of the effective dot density of each of the plurality of base colors, wherein the calibration parameters comprise the full tone reflectance values for a plurality of primary colors, and wherein the reflectance prediction circuit comprises:

means for determining an estimated effective dot density for each primary color of the plurality of primary colors based upon the plurality of effective dot density estimates;

means for calculating a raised full tone reflectance for each of the primary colors by raising the full tone reflectance of each of the primary colors to the 1/n power, where n is a predetermined constant;

means for calculating a halftone reflectance for each of the primary colors by multiplying the raised full tone reflectance of each of the primary colors by the estimated effective dot density for each of the primary colors;

means for summing the halftone reflectances of each of the primary colors; and means for raising the summed halftone reflectances to the n power.

7. The device of claim 6 further comprising calibration means for determining the full tone reflectance of each of the primary colors, wherein the calibration means comprises:

means for combining the base colors to produce a given primary color;

means for producing a full tone image having 100% dot density of the primary color at a given ink density; and means for measuring the reflectance of the full tone image.

8. The device of claim 1 wherein the reflectance comparing circuit comprises:

means for determining the differences between each actual reflectance value and the corresponding predicted reflectance value to generate a plurality of reflectance difference values;

means for squaring each of the plurality of reflectance difference values to produce a plurality of squared difference values; and means for summing the squared difference values.

9. The device of claim 8 wherein the reflectance error comprises a plurality of digital data values and wherein the estimation adjustment circuit comprises means for performing a gradient-expansion search of the plurality of digital data values to generate the adjusted effective dot density estimates.

10. The device of claim 8 wherein the estimation adjustment circuit comprises means for performing a linear matrix transformation to generate the adjusted effective dot density estimates.

11. A device for determining the effective dot density of each of a plurality of base colors based on a plurality of actual reflectance values, comprising:

means for determining an initial estimate of the density of each of the plurality of base colors;

means for predicting the reflectance values that would result from measuring an image composed of the base colors in the estimated effective dot densities;

means for comparing the actual reflectance values to the predicted reflectance values;

means for generating a reflectance error term based on the comparison between the actual reflectance values and the predicted reflectance values; and means for adjusting the estimated base color densities to minimize the reflectance error term when the reflectance error term is greater than a predetermined maximum acceptable error.

12. A device for controlling the amount of each of a plurality of base inks used to print a multi-colored image, comprising:

measuring means for measuring light reflected off the image, the measuring means generating a plurality of actual reflectance values representative of the reflected light;

an actual dot density circuit coupled to the measuring means and disposed to receive the plurality of actual reflectance values, the actual dot density circuit comparing the plurality of actual reflectance values with a plurality of predicted reflectance values, the actual dot density circuit generating a plurality of actual effective dot densities when the difference between the plurality of actual reflectance values and the plurality of predicted reflectance values is less than a predetermined threshold;

a dot density error circuit coupled to the actual dot density circuit and disposed to receive the plurality of actual effective dot densities therefrom, wherein the dot density error circuit compares the plurality of actual effective dot densities with a plurality of desired effective dot densities and generates an effective dot density error based on the comparison;

an adjustment calculation circuit coupled to the threshold comparison circuit and disposed to receive the effective dot density error therefrom, the adjustment calculation circuit generating, based on the effective dot density error, control signals representative of changes in the ink density of each of the plurality of base inks to be used in printing the multi-colored image; and an ink control circuit coupled to the adjustment calculation circuit and disposed to receive the control signals therefrom, wherein the ink control circuit is further coupled to a plurality of ink suppliers, wherein said ink suppliers may be configured in any one of a plurality of settings, wherein the setting of each of said plurality of ink suppliers determines the ink density of the ink supplied by the supplier, wherein the ink control circuit transmits to each of the ink suppliers a setting selection signal to select a setting for the ink suppliers based on the control signals.

13. The device of claim 12 further comprising a reference storage coupled to the dot density error circuit, wherein the reference storage contains the plurality of desired effective dot densities.

14. The device of claim 12 wherein the measuring means is a spectrophotometer.

15. The device of claim 12 wherein the actual dot density circuit comprises:

a reflectance prediction circuit coupled to the measuring means and to the dot density error circuit, the reflectance prediction circuit receiving the plurality of actual reflectance values and generating the plurality of predicted reflectance values;

a reflectance comparing circuit coupled to the measuring means and to the reflectance prediction circuit, the reflectance comparing circuit receiving the plurality of actual reflectance values from the measuring means and the plurality of predicted reflectance values from the reflectance prediction circuit and generating a reflectance error based on the differences between the predicted reflectance values and the actual reflectance values;

an error comparison circuit coupled to the reflectance comparing circuit and to the reflectance prediction circuit, the error comparison circuit receiving the reflectance error from the reflectance comparing circuit and comparing the reflectance error with a maximum acceptable error value and generating a signal indicative of the results of the comparison; and an estimation adjustment circuit coupled to the error comparison circuit and to the reflectance prediction circuit, the estimation adjustment circuit receiving the signal and generating a plurality of adjusted effective dot density estimates to the reflectance prediction circuit when the signal exceeds a predetermined error threshold.

16. A method for determining the effective dot density for each of a plurality of base colors in a printed image from a plurality of actual reflectance values of the printed image, comprising the steps of:

(a) determining an initial estimate of the effective dot density for each of the plurality of base colors;

(b) predicting a plurality of reflectance values corresponding to the plurality of base colors having the estimated effective dot densities;

(c) comparing the plurality of actual reflectance values to the plurality of predicted reflectance values;

(d) generating a reflectance error term based on the comparison between the actual reflectance values and the predicted reflectance values;

(e) adjusting the estimates of the effective dot densities to minimize the reflectance error term when the reflectance error term is greater than a predetermined maximum acceptable error; and (f) repeating steps (b) through (e) until the reflectance error term is less than or equal to a predetermined maximum acceptable error.

17. The method of claim 16 wherein the initial estimate of the density of each of the plurality of base colors is the desired effective dot density for the base color.

18. The method of claim 16 wherein the initial estimate of the density of each of the plurality of base colors is zero percent.

19. The method of claim 16 wherein the initial estimate of the density of each of the plurality of base colors is one-hundred percent.

20. The method of claim 16 wherein the step of predicting a plurality of reflectance values corresponding to the plurality of base colors having the estimated effective dot densities comprises the steps of:

determining an estimated effective dot density for each of the primary colors based upon the estimated effective dot densities of the base colors;

for each of a plurality of predetermined wavelengths performing the steps of:

calculating a raised full tone reflectance for each of the primary colors by raising the full tone reflectance of each of the primary colors at the given wavelength to the 1/n power, where n is one of a predetermined constant and a predetermined function with respect to wavelength;

calculating a halftone reflectance for each of the primary colors by multiplying the raised full tone reflectance of each of the primary colors by the estimated effective dot density for each of the primary colors;

summing the halftone reflectances of each of the primary colors; and raising the summed halftone reflectances to the n power.

21. The method of claim 20 wherein the full tone reflectance of each of the primary colors is determined by:

combining the base colors to produce a given primary color;

producing a full tone image having one-hundred percent effective dot density of the primary color at a given ink density; and measuring the reflectance of the full tone image.

22. The method of claim 16 wherein the step of generating an error term based on the comparison between the actual reflectance values and the predicted reflectance values comprises the steps of:

determining the differences between each actual reflectance value and the corresponding predicted reflectance value to generate a plurality of reflectance difference values;

squaring each of the plurality of reflectance difference values to produce a plurality of squared difference values; and summing the squared difference values.

23. The method of claim 22 wherein the step of adjusting the estimated effective dot densities to minimize the error term when the error term is greater than a predetermined maximum acceptable error comprises the steps of:

comparing the error term to the predetermined maximum acceptable error term; and when the error term is greater than the predetermined maximum acceptable error term, performing a gradient-expansion search to determine adjusted effective dot densities which minimize the reflectance error term; and using the adjusted effective dot densities determined by the gradient-expansion search as the estimates of the effective dot densities.

24. The method of claim 16 wherein the reflectance error term is determined by the steps of:

determining the differences between each actual reflectance value and the corresponding predicted reflectance value to generate a plurality of reflectance difference values;

squaring each of the plurality of reflectance difference values to produce a plurality of squared difference values; and summing the squared difference values.

25. The method of claim 24 wherein the step of adjusting comprises performing a gradient-expansion search to generate the adjusted effective dot density estimates.

* * * * *